UNITED STATES PATENT OFFICE.

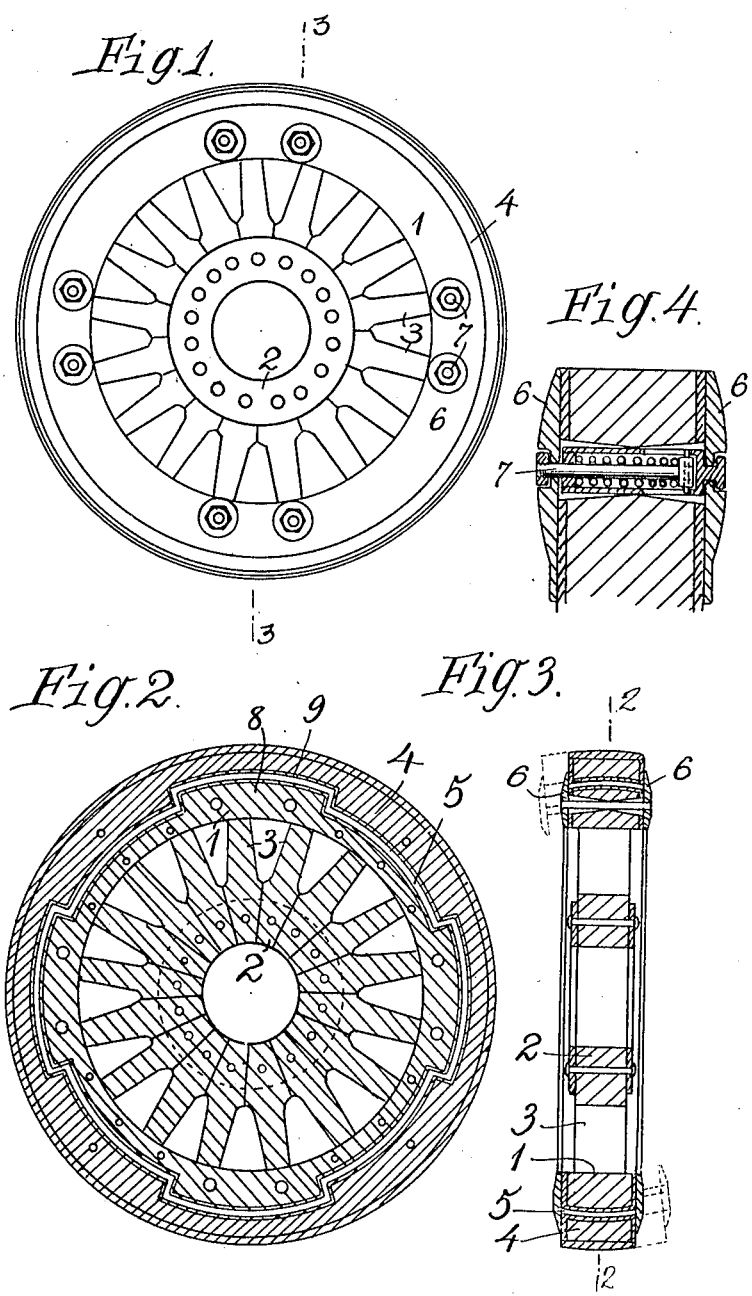

VICTOR HENRI NALINNE, OF BRUSSELS, BELGIUM.

ELASTIC WHEEL.

1,292,357.      Specification of Letters Patent.      Patented Jan. 21, 1919.

Application filed June 24, 1918. Serial No. 241,681.

*To all whom it may concern:*

Be it known that I, VICTOR HENRI NA-LINNE, a subject of the King of Belgium, residing at Brussels, in the Kingdom of Belgium, have invented certain new and useful Improvements in Elastic Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an elastic wheel for trucks, carriages and the like by means of which the elastic material such as rubber is utilized to its fullest extent without exposing the said material to friction and wear by contact with the road.

The said wheel chiefly consists of two separate parts, an inner member integral with the hub and an outer member forming the rim. The inner member is provided with a plurality of teeth on its circumference, and the exterior member or rim is provided on its inside with a plurality of teeth corresponding to the teeth on the inner member and engaging the same through an intermediate layer of elastic material.

Besides the two members the wheel comprises two disks fastened one on each side of the wheel by means of spring actuated bolts or the like, which permit the disks to be moved out from their normal position against the action of the springs.

On the drawing Figure 1 is a side view of the wheel. Fig. 2 is a section of the wheel on line 2—2 of Fig. 3. Fig. 3 is a section on the line 3—3 of Fig. 1, and Fig. 4 is a detail on a slightly larger scale illustrating the spring actuated fastening bolts for the side disks.

The inner member which comprises a rim 1, hub 2 and spokes 3, fits into the outer member 4 which constitutes the wheel rim, the space between the outer circumference of the inner member and the inner circumference of the outer member being filled with elastic material 5. The inner and outer wheel members are provided with coöperating recesses or teeth 8, 9 in order to retain the elastic material in place. Annular disks 6 are yieldingly connected to both sides of the inner member 1 by means of spring actuated telescopic bolts 7. The diameter of disks 6 is somewhat smaller than the diameter of the outer member 4, and said disks 6 serve to prevent member 4 from being moved so far sidewise with regard to the inner member 1 that their corresponding teeth are brought out of engagement with each other, said spring actuated disks also serving to bring the two parts of the wheel back into their normal position as soon as no lateral strains act on the rim.

When striking an obstruction during a drive the outer ring-member in most cases will be moved sidewise or tipped with regard to the inner member as illustrated on Fig. 3 in dotted lines. The adjacent surfaces of the outer and inner wheel members are concave and convex respectively in cross section.

Claims:

1. In an elastic wheel for trucks, carriages and the like, an inner wheel member and an outer wheel member connected together by means of an intermediate layer of elastic material, and spring actuated annular disks yieldingly engaging the sides of said wheel members, whereby the outer wheel member may perform a limited tilting movement in a direction substantially transverse to the plane of the inner member.

2. In an elastic wheel for trucks, carriages and the like, an inner wheel member, an outer wheel member, a layer of elastic material between said members, annular disks covering adjacent parts of the inner and outer members in both sides of the wheel, and spring controlled bolts yieldingly connecting the disks, whereby the outer wheel member may perform a limited tilting movement in a direction substantially transverse to the plane of the inner member.

3. In an elastic wheel for trucks, carriages and the like, an inner wheel member, an outer wheel member, a layer of elastic material between the opposing peripheries of the wheel members, annular disks covering adjacent parts of the inner and outer members on both sides of the wheel, spring controlled bolts yieldingly connecting the disks whereby the outer member may perform a limited lateral movement out of the plane of the inner member, the inner periphery of the outer member being concave in cross section and the outer periphery of the inner member being convex in cross section.

In testimony that I claim the foregoing as my invention, I have signed my name in presence of two subscribing witnesses.

VICTOR HENRI NALINNE.

Witnesses:
L. WESENBERG MOHEY,
OTTO B. RAVNDAL.

Copies of this patent may be obtained for five cents each, by addressing the "Commissioner of Patents, Washington, D. C."